(12) United States Patent
Shibata et al.

(10) Patent No.: US 8,227,994 B2
(45) Date of Patent: Jul. 24, 2012

(54) VEHICULAR LAMP

(75) Inventors: Hiroki Shibata, Shizuoka (JP); Mikio Urushibata, Shizuoka (JP); Hideki Uchida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 424 days.

(21) Appl. No.: 12/557,556

(22) Filed: Sep. 11, 2009

(65) Prior Publication Data
US 2010/0079071 A1 Apr. 1, 2010

(30) Foreign Application Priority Data
Sep. 30, 2008 (JP) ................................. 2008-252347

(51) Int. Cl.
*B60Q 1/14* (2006.01)

(52) U.S. Cl. ............ 315/77; 315/82; 315/83; 315/185 R; 315/192; 315/291

(58) Field of Classification Search .................. None
See application file for complete search history.

(56) References Cited

U.S. PATENT DOCUMENTS

| | | | |
|---|---|---|---|
| 6,844,681 B2 | 1/2005 | Serizawa et al. | |
| 7,329,994 B2 | 2/2008 | Toda et al. | |
| 2003/0025465 A1 | 2/2003 | Swanson et al. | |
| 2003/0227257 A1* | 12/2003 | Serizawa et al. | 315/77 |
| 2006/0171135 A1* | 8/2006 | Ishizaka et al. | 362/11 |
| 2010/0109537 A1* | 5/2010 | Nishino et al. | 315/185 R |

FOREIGN PATENT DOCUMENTS

| | | |
|---|---|---|
| JP | 2004-009825 | 1/2004 |
| JP | 2006-248509 | 9/2006 |
| KR | 10-2006-0097815 | 9/2006 |

\* cited by examiner

*Primary Examiner* — Anh Tran
(74) *Attorney, Agent, or Firm* — Fish & Richardson P.C.

(57) ABSTRACT

The disclosure facilitates determining the presence of an abnormality of a light source in a vehicular lamp using, as a determination condition, a number of disconnected semiconductor light-emitting elements among multiple semiconductor light-emitting elements. The vehicular lamp includes a first light source block that has light-emitting diodes LED1 to LED6 connected in parallel; a second light source block that has light-emitting diodes LED7 to LED12 connected in parallel; and an abnormality determination circuit that controls a supply of current from an on-board battery to the light source blocks and determines whether an abnormality is presence in the light source blocks. The abnormality determination circuit determines the presence of an abnormality if the disconnected light-emitting diodes in one of the light source blocks exceed a predetermined number and current cannot flow to the light source block. In such case, the supply of current to the light source blocks is stopped.

12 Claims, 3 Drawing Sheets

VEHICULAR LAMP

TECHNICAL FIELD

The present disclosure relates to a vehicular lamp that uses a semiconductor light-emitting element as a light source.

BACKGROUND

There are conventional vehicular lamps that use a semiconductor light-emitting element such as a light-emitting diode (LED) as a light source. The amount of luminescence of the LED when used as a light source is less than that of a light bulb. Therefore, such conventional vehicular lamps employ a configuration that connects multiple LEDs in parallel.

In a lamp configured to use multiple LEDs connected in parallel as a light source, even if some of the LEDs do not emit light as the result of an abnormality such as a disconnection, the other LEDs can still emit light so as to satisfy a light distribution standard required for a lamp (e.g., a law prescribing light source luminosity). If the number of abnormal LEDs increases, however, it becomes less likely that the light emission of the normal LEDs can satisfy the light distribution standard required for the lamp.

Hence, a vehicular lamp has been proposed that includes a disconnection circuit for detecting an abnormality of the LED, especially disconnection of the LED (see, e.g., Japanese Patent Application Laid-Open (Kokai) No. 2006-248509 (pages 4 to 6 and FIGS. 2 and 3)).

The vehicular lamp described in the foregoing patent document is equipped with a luminous unit that is composed of the parallel connection of multiple LEDs; a lamp that is fitted with a line breakage detection circuit designed to detect line breakage of individual LEDs in the luminous portion; and a judgment circuit that is linked with the line breakage detection circuit through a signal line and designed to judge abnormality of the LEDs. The judgment circuit is configured so as to determine an abnormal LED based on an electric potential of the signal line.

In the foregoing vehicular lamp, when an individual LED becomes disconnected, an electric potential corresponding to the disconnected LED is provided from the line breakage detection circuit to the judgment circuit via the signal line. Therefore, the judgment circuit can determine the number of abnormal LEDs and their location/arrangements within the lamp based on the electric potential of the signal line.

However, in the foregoing vehicular lamp, line breakage detection circuits are provided for each LED connected in parallel. This increases the number of components needed to build a structure for satisfying the light distribution standard required for a lamp using the line breakage detection circuits.

SUMMARY

The present invention was devised in light of the problems identified above. The present disclosure describes a vehicular lamp that determines an abnormality of a light source by using, as a determination condition, the number of disconnected semiconductor light-emitting elements.

According to one aspect of the invention, a vehicular lamp includes: a light source that has multiple semiconductor light-emitting elements connected in parallel; and an abnormality determination circuit that controls a supply of current from a power source to the light source, and determines an abnormality of the light source. The abnormality determination circuit determines an abnormality if the semiconductor light-emitting elements that are disconnected exceeds a predetermined number, and stops the supply of current to the light source at the time of determination.

Regarding the supply of current from the power source to the light source, when the disconnected semiconductor light-emitting elements are equal to or below the predetermined number, current from the power source is supplied to the light source. If the disconnected semiconductor light-emitting elements exceed the predetermined number, an abnormality is determined, and the supply of current to the light source stopped.

Thus, the circuitry determines whether the disconnected semiconductor light-emitting elements exceed the predetermined number and controls the supply of current to the light source in accordance with the determination result. Therefore, to determine abnormality of the light source, there is no need to provide a line breakage detection circuit that determines whether any of the semiconductor light-emitting elements is disconnected, which can help reduce the number of components and lower costs.

Furthermore, even if some of the semiconductor light-emitting elements disconnect, current is supplied to the light source until an abnormality is determined. Therefore, the light source can be utilized effectively.

According to another aspect of the invention, the vehicular lamp is configured such that the predetermined number is the number of semiconductor light-emitting elements in parallel.

When determining whether the disconnected semiconductor light-emitting elements exceed the predetermined number, the predetermined number can be the number of semiconductor light-emitting elements in parallel. This requires that the semiconductor light-emitting elements be configured as a group of semiconductor light-emitting elements that are connected in parallel to one another.

If the semiconductor light-emitting elements are each connected in series, the disconnection of even one semiconductor light-emitting element stops the current to the light source. However, if the semiconductor light-emitting elements are configured as a group of semiconductor light-emitting elements connected in parallel to one another, current can be supplied to the light source through normal semiconductor light-emitting elements until the parallel number of disconnected semiconductor light-emitting elements exceeds the predetermined number. In addition, when the parallel number of disconnected semiconductor light-emitting elements exceeds the predetermined number, the circuit is shut off and current no longer flows. Therefore, an abnormality can be determined.

According to a further aspect of the invention, the vehicular lamp can be configured such that the light source is formed by connecting the semiconductor light-emitting elements in a matrix configuration.

By connecting the semiconductor light-emitting elements in a matrix configuration to form the light source, the semiconductor light-emitting elements can be formed as a group of semiconductor light-emitting elements connected in parallel to one another. In this case, when determining whether the disconnected semiconductor light-emitting exceed the predetermined number, the predetermined number can be the number of semiconductor light-emitting elements in parallel. Accordingly, current can be supplied to the light source through the normal semiconductor light-emitting elements until the parallel number of disconnected semiconductor light-emitting elements exceeds the predetermined number. In addition, when the parallel number of disconnected semiconductor light-emitting elements exceeds the predetermined number, the circuit is shut off and current no longer flows. Therefore, an abnormality can be determined.

According to another aspect, the vehicular lamp further can include a supply voltage monitoring circuit that stops the abnormality determination performed by the abnormality determination circuit if a voltage of the power source falls to, or below, a set voltage.

By stopping the abnormality determination performed by the abnormality determination circuit when the voltage of the power source falls to, or below, the set voltage, the supply of current from the power source to the light source can be continued when the voltage of the power source falls to or below a set voltage.

According to another aspect, the vehicular lamp can be configured such that the abnormality determination circuit includes an oscillation circuit that converts a current from the power source to the light source into a pulse width modulation signal.

By providing in the abnormality determination circuit an oscillation circuit that converts a current from the power source to the light source into a pulse width modulation signal, a forward voltage (Vf) applied to the semiconductor light-emitting elements of the light source from the abnormality determination circuit can be increased, thus maintaining a current (If) of the semiconductor light-emitting elements within a fixed range. Therefore, the semiconductor light-emitting element is not affected by fluctuations in a Vf-If characteristic, and can be lit at a near constant brightness.

The vehicular lamp described in this disclosure can help reduce the number of components and lower costs.

In some implementations, an abnormality can be determined when a parallel number of disconnected semiconductor light-emitting elements exceeds a predetermined number.

Likewise, in some cases, multiple semiconductor light-emitting elements can be formed as a group of semiconductor light-emitting elements connected in parallel to one another.

Also, a supply of current from a power source to a light source can be continued when a voltage of the power source falls to, or below, a set voltage.

In addition, in some implementations, the semiconductor light-emitting element is not affected by fluctuations in a Vf-If characteristic, and can be lit at a near constant brightness.

Other features and advantages will be readily apparent from the following detailed description, the accompanying drawings, and the claims.

BEST MODES FOR CARRYING OUT THE INVENTION

Figure 1:
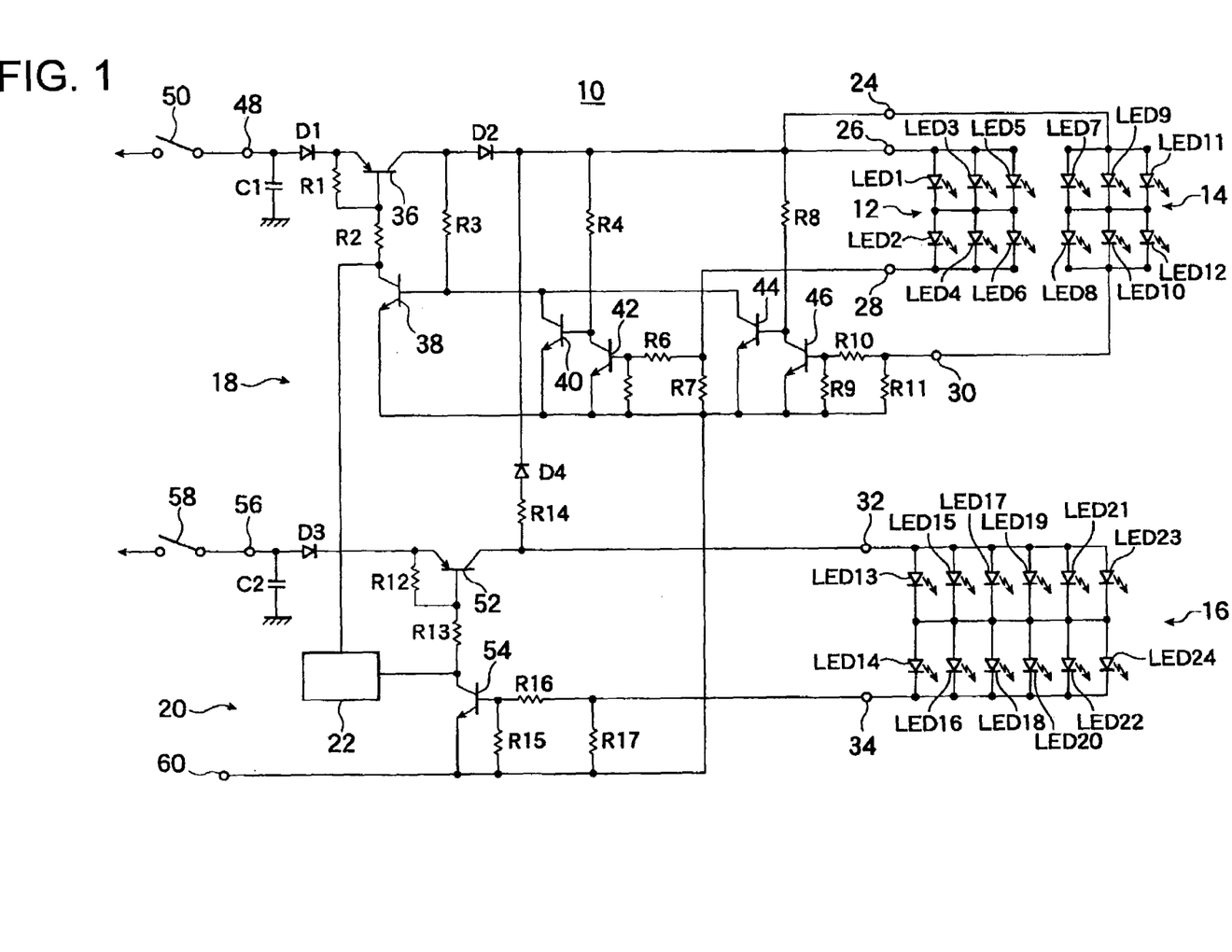
FIG. 1 is an example of a circuit diagram of a vehicular lamp that shows a first embodiment of the present invention.

As illustrated in the example of FIG. 1, a vehicular lamp 10 has a structure including light source blocks 12, 14, 16, abnormality determination circuits 18, 20, and a supply voltage monitoring circuit 22.

In the illustrated example, the light source block 12 includes six light-emitting diodes (semiconductor light-emitting elements) LED1 to LED6 as a semiconductor light source forming a stop light, for example. The light-emitting diodes LED1 to LED6 are divided into upper and lower levels each having a set of three light-emitting diodes connected to each other in parallel (parallel number: 3), and linked in a matrix configuration so as to form a matrix with two rows and three columns.

More specifically, the light-emitting diodes LED1, LED2, are mutually connected in series, the light-emitting diodes LED3, LED4 are mutually connected in series, and the light-emitting diode LED5 and the light-emitting diode LED6 are also mutually connected in series. The light-emitting diodes LED1, LED3, LED5 are mutually connected in parallel, and each anode thereof is connected to an output terminal 26. The light-emitting diodes LED2, LED4, LED6 are mutually connected in parallel, and each cathode thereof is connected to an output terminal 28.

The light source block 14 includes six light-emitting diodes LED7 to LED12 as a semiconductor light source for forming a stop lamp together with the light source block 12, for example.

The light-emitting diodes LED7 to LED12 are divided into upper and lower levels each having a set of three light-emitting diodes connected to each other in parallel (parallel number: 3), and linked in a matrix configuration so as to form a matrix with two rows and three columns.

More specifically, the light-emitting diodes LED7, LED8, are mutually connected in series, the light-emitting diodes LED9, LED10 are mutually connected in series, and the light-emitting diode LED11 and the light-emitting diode LED12 are also mutually connected in series. The light-emitting diodes LED7, LED9, LED11 are mutually connected in parallel, and each anode thereof is connected to an output terminal 24. The light-emitting diodes LED8, LED10, LED12 are mutually connected in parallel, and each cathode thereof is connected to an output terminal 30.

The light source block 16 includes twelve light-emitting diodes LED13 to LED24 as a semiconductor light source for forming a tail lamp together with the light source blocks 12, 14 for example.

The light-emitting diodes LED13 to LED24 are divided into upper and lower levels each having a set of six light-emitting diodes connected to each other in parallel (parallel number: 6), and linked in a matrix configuration so as to form a matrix with two rows and six columns.

More specifically, the light-emitting diodes LED13, LED14, are mutually connected in series, the light-emitting diodes LED15, LED16 are mutually connected in series, the light-emitting diodes LED17, LED18 are mutually connected in series, the light-emitting diodes LED19, LED20 are mutually connected in series, the light-emitting diodes LED21, LED22, are mutually connected in series, and the light-emitting diodes LED23, LED24, are mutually connected in series.

The light-emitting diodes LED13, LED15, LED17, LED19, LED21, LED23 are mutually connected in parallel, and each anode thereof is connected to an output terminal 32. The light-emitting diodes LED14, LED16, LED18, LED20, LED22, LED24 are mutually connected in parallel, and each cathode thereof is connected to an output terminal 34.

The abnormality determination circuit 18 controls the supply of current from an on-board battery (DC power supply) to the light source blocks 12, 14. The abnormality determination circuit 18 determines whether there is an abnormality of the light source blocks 12, 14, and in the illustrated example, includes a PNP transistor 36; NPN transistors 38, 40, 42, 44, 46; a capacitor C1; diodes D1, D2; and resistances R1 to R11.

A connection point of the capacitor C1 and the diode D1 is connected to an input terminal 48. The cathode of the diode D1 is connected to the emitter of the PNP transistor 36. The base of the PNP transistor 36 is connected to the collector of the NPN transistor 38 through the resistance R2, and the collector of the PNP transistor 36 is connected to the output terminals 24, 26 through the diode D2. The emitter of the NPN transistor 38 is grounded, and the base of the NPN transistor 38 is connected to the collectors of the NPN transistors 40, 44.

The emitter of the NPN transistor 40 is grounded, while the base of the NPN transistor 40 is connected to the collector of the NPN transistor 42 and also connected to the output terminals 24, 26 through the resistance R4. The emitter of the NPN transistor 42 is grounded, while the base of the NPN transistor 42 is grounded through the resistance R5 and also connected to the output terminal 28 through the resistance R6. The output terminal 28 is grounded through the current-limiting resistance R7.

The emitter of the NPN transistor 44 is grounded, while the base of the NPN transistor 44 is connected to the collector of the NPN transistor 46 and also connected to the output terminals 24, 26 through the resistance R8. The emitter of the NPN transistor 46 is grounded, while the base of the NPN transistor 46 is grounded through the resistance R9 and also connected to the output terminal 30 through the resistance R10. The output terminal 30 is grounded through the current-limiting resistance R1.

The input terminal 48 is connected to the on-board battery (DC power supply) through a switch 50 and a main abnormality detection circuit (not shown). The switch 50 turns on when the brake pedal is depressed, but otherwise remains off.

If the switch 50 is turned on, current from the on-board battery is provided to the input terminal 48. When the light source blocks 12, 14 are in normal operation at such time, the PNP transistor 36 and the NPN transistor 38 are turned on, thus lighting each of the light-emitting diodes LED1 to LED6 of the light source block 12 and the light-emitting diodes LED7 to LED12 of the light source block 14. In other words, depression of the brake pedal lights the stop lamp.

Even if there is a disconnection at such time between two parallel-connected light-emitting diodes among either the six light-emitting diodes LED1 to LED6 of the light source block 12 or the six light-emitting diodes LED7 to LED12 of the light source block 14, 120% of the rated current, for example, is supplied such that lighting the remaining four light-emitting diodes satisfies a light distribution standard.

When the light-emitting diodes LED1 to LED6 of the light source block 12 are lit, the current of the light source block 12 flows to the resistance R7, and a voltage drop occurs at both ends of the resistance R7. The voltage drop turns on the NPN transistor 42, and when this happens, the NPN transistor 40 turns off to maintain the on state of the NPN transistor 38.

Similarly, when the light-emitting diodes LED7 to LED12 of the light source block 14 are lit, the current of the light source block 14 flows to the resistance R11, and a voltage drop occurs at both ends of the resistance R11. The voltage drop turns on the NPN transistor 46, and when this happens, the NPN transistor 44 turns off to maintain the on state of the NPN transistor 38.

However, when depression of the brake pedal stops and the switch 50 turns off, the PNP transistor 36 and the NPN transistor 38 are turned off, thus turning off each of the light-emitting diodes LED1 to LED6 of the light source block 12 and the light-emitting diodes LED7 to LED12 of the light source block 14.

The abnormality determination circuit 20 controls the supply of current from an on-board battery (DC power supply) to the light source blocks 12, 14, 16. As a circuit for determining an abnormality of the light source block 16, the abnormality determination circuit 20 includes a PNP transistor 52; an NPN transistor 54; a capacitor C2; diodes D3, D4; and resistances R12 to R17.

A connection point of the capacitor C2 and the diode D3 is connected to an input terminal 56. The cathode of the diode D3 is connected to the emitter of the PNP transistor 52. The base of the PNP transistor 52 is connected to the collector of the NPN transistor 54 through the resistance R13, while the collector of the PNP transistor 52 is connected to the output terminals 24, 26 through the resistance R14 and the diode D4, and also connected to the output terminal 32. The emitter of the NPN transistor 54 is grounded, while the base of the NPN transistor 54 is grounded through the resistance R15 and also connected to the output terminal 34 through the resistance R16. The output terminal 34 is grounded through the current-limiting resistance R17.

The input terminal 56 is connected to the on-board battery (DC power supply) through a switch 58 and a main abnormality detection circuit (not shown). The switch 58 turns on in response to an operation for lighting the tail lamp, but otherwise remains off.

If the switch 58 is turned on, current from the on-board battery is provided to the input terminal 56. When each light-emitting diode LED of the light source blocks 12, 14, 16 is in normal operation at such time, the PNP transistor 52 and the NPN transistor 54 are turned on, thus lighting each of the light-emitting diodes LED1 to LED6 of the light source block 12, the light-emitting diodes LED7 to LED12 of the light source block 14, and the light-emitting diodes LED13 to LED24 of the light source block 16. In other words, the tail lamp turns on in response to an operation for lighting the tail lamp.

At such time, a current smaller than the current used when the light source blocks 12, 14 function as a stop lamp is supplied through the resistance R14 and the diode D4 to the light-emitting diodes LED1 to LED6 of the light source block 12 and the light-emitting diodes LED7 to LED12 of the light source block 14.

Even if there is a disconnection among five parallel-connected light-emitting diodes among the twelve light-emitting diodes LED13 to LED24 of the light source block 16, tens of percent of the rated current, for example, is supplied such that lighting the remaining seven light-emitting diodes satisfies the light distribution standard.

However, when the operation for lighting the tail lamp is cancelled and the switch 58 turns off, the PNP transistor 52 and the NPN transistor 54 are turned off, thus turning off each of the light-emitting diodes LED1 to LED6 of the light source block 12, the light-emitting diodes LED7 to LED12 of the light source block 14, and the light-emitting diodes LED13 to LED24 of the light source block 16.

The supply voltage monitoring circuit 22 monitors the voltage (supply voltage) applied to the input terminals 48, 56. When the voltage (supply voltage) applied to the input terminals 48, 56 exceeds a set voltage, there is high impedance at the connection point between the resistance R2 and the collector of NPN transistor 38, and at the connection point between the resistance R13 and the collector of the NPN transistor 54.

However, when the voltage (supply voltage) applied to the input terminal 48 is equal to or less than the set voltage, the supply voltage monitoring circuit 22 forcibly turns on the PNP transistor 36 and sets the connection point between the resistance R2 and the collector of the NPN transistor 38 at the low level. In other words, when the voltage (supply voltage) applied to the input terminal 48 is equal to or less than the set voltage, the supply voltage monitoring circuit 22 forcibly stops the abnormality determination circuit 18 from performing the abnormality determination, and supplies current from the on-board battery to the light source blocks 12, 14 so as to light the light source blocks 12, 14 as the stop lamp.

Thus, the supply of current from the on-board battery to the light source blocks 12, 14 can be continued when the voltage (supply voltage) applied to the input terminal 48 is equal to or less than the set voltage.

Likewise, when the voltage (supply voltage) applied to the input terminal 58 falls to, or below, the set voltage, the supply voltage monitoring circuit 22 forcibly turns on the PNP transistor 52 using the connection point between the resistance R13 and the collector of the NPN transistor 54 as the low level. In other words, when the voltage (supply voltage) applied to the input terminal 58 is equal to or less than the set voltage, the supply voltage monitoring circuit 22 forcibly stops the abnormality determination circuit 20 from performing the abnormality determination, and supplies current from the on-board battery to the light source blocks 12, 14, 16 so as to light the light source blocks 12, 14, 16 as the tail lamp.

Thus, the supply of current from the on-board battery to the light source blocks 12, 14, 16 can be continued when the voltage (supply voltage) applied to the input terminal 56 is equal to or less than the set voltage.

An input terminal 60 is connected to a negative terminal of the on-board battery (DC power supply) as a ground potential for each circuit.

In the illustrated configuration, turning on the switch 50 provides current from the on-board battery to the input terminal 48. When each light-emitting diode LED of the light source blocks 12, 14 is in normal operation, the PNP transistor 36 and the NPN transistor 38 are then turned on, thus lighting each of the light-emitting diodes LED1 to LED6 of the light source block 12 and the light-emitting diodes LED7 to LED12 of the light source block 14.

A disconnection of any light-emitting diode may occur among either the light-emitting diodes LED1 to LED6 of the light source block 12 or the light-emitting diodes LED7 to LED12 of the light source block 14 (e.g., the light-emitting diode LED1 on the upper level may disconnect). In this case, current flows to the light-emitting diodes LED2, LED4, and LED6 on the lower level via the light-emitting diodes LED3, LED5 on the upper level of the light source block 12. At such time, the current flowing to the light-emitting diodes LED3, LED5 is half the total current (sum current) of the light-emitting diodes LED2, LED4, and LED6.

Current flowing to the light source block 12 turns on the NPN transistor 42, which together with the turned-on PNP transistor 36 and the NPN transistor 38, lights the light-emitting diodes LED2 to LED6. In this case, the light source block 12 in cooperation with the light source block 14 functions as the stop lamp.

Alternatively, a disconnection of any two light-emitting diodes connected in parallel may occur among either the light-emitting diodes LED1 to LED6 of the light source block 12 or the light-emitting diodes LED7 to LED12 of the light source block 14 (e.g., the light-emitting diodes LED1 and LED3 on the upper level may disconnect). In this case, current flows to the light-emitting diodes LED2, LED4, and LED6 on the lower level via the light-emitting diode LED5 on the upper level of the light source block 12. At such time, the current flowing to the light-emitting diode LED5 is equivalent to the total current (sum current) of the light-emitting diodes LED2, LED4, and LED6.

Current flowing to the light source block 12 turns on the NPN transistor 42, which together with the turned-on PNP transistor 36 and the NPN transistor 38, lights the light-emitting diodes LED2, LED4, LED5, LED6. In such case, the parallel number of disconnected light-emitting diodes (i.e., LED1, LED3) is a predetermined number of two or less (a number that satisfies the light distribution standard). Therefore, the light source block 12 in cooperation with the light source block 14 functions as the stop lamp.

Meanwhile, a disconnection of any three light-emitting diodes connected in parallel may occur among either the light-emitting diodes LED1 to LED6 of the light source block 12 or the light-emitting diodes LED7 to LED12 of the light source block 14 (e.g., the light-emitting diodes LED1, LED3, and LED5 on the upper level may disconnect). Namely, the parallel number of disconnected light-emitting diodes (i.e., LED1, LED3, LED5) is three, which is more than the predetermined number of two (the number that satisfies the light distribution standard). In this case, the circuit is shut off and current no longer flows to the light source block 12.

As a consequence, the voltage at both ends of the resistance R7 drops (to 0 V), which turns off the NPN transistor 42 and turns on the NPN transistor 40. When the NPN transistor 40 turns on, the NPN transistor 38 and the PNP transistor 36 are turned off, which stops the supply of current to the light source blocks 12, 14. Accordingly, the light-emitting diodes LED1 to LED6 of the light source block 12 and the light-emitting diodes LED7 to LED12 of the light source block 14 are all turned off.

Similarly, when the light-emitting diodes LED1 to LED6 of the light source block 12 are in normal operation, there may be a disconnection of any two light-emitting diodes connected in parallel among the light-emitting diodes LED7 to LED12 of the light source block 14, e.g., the light-emitting diodes LED7 and LED9 on the upper level may disconnect. In this case, current flows to the light-emitting diodes LED8 and LED10 on the lower level via the light-emitting diode LED11 on the upper level of the light source block 14.

At this time, the NPN transistor 46 is maintained in the on state, which together with the turned-on PNP transistor 36 and the NPN transistor 38, lights the light-emitting diodes LED8, LED10, LED11, LED12. In such case, the parallel number of disconnected light-emitting diodes (i.e., LED7, LED9) is a predetermined number of two or less (a number that satisfies the light distribution standard). Therefore, the light source block 14 in cooperation with the light source block 12 functions as the stop lamp.

Meanwhile, when the light-emitting diodes LED1 to LED6 of the light source block 12 are in normal operation, a disconnection of any three light-emitting diodes connected in parallel may occur among the light-emitting diodes LED7 to LED12 of the light source block 14 (e.g. the light-emitting diodes LED7, LED9, and LED11 on the upper level may disconnect). Namely, the parallel number of disconnected light-emitting diodes (i.e., LED7, LED9, LED11) is three, which is more than the predetermined number of two (the number that satisfies the light distribution standard). In this case, the circuit is shut off and current no longer flows to the light source block 14.

As a consequence, the voltage at both ends of the resistance R11 drops, which turns off the NPN transistor 46 and turns on the NPN transistor 44. When the NPN transistor 44 turns on, the NPN transistor 38 and the PNP transistor 36 are turned off, which stops the supply of current to the light source blocks 12, 14. Accordingly, the light-emitting diodes LED1 to LED6 of the light source block 12 and the light-emitting diodes LED7 to LED12 of the light source block 14 are all turned off.

When the supply of current to the light source blocks 12, 14 is stopped, a main abnormality detection circuit (not shown) between the switches 50, 58 and the on-board battery (DC power supply) communicates the occurrence of an abnormality resulting from the disconnection in the light source blocks 12, 14 to a vehicle control unit (not shown).

However, turning on the switch 58 provides current from the on-board battery to the input terminal 58. When each light-emitting diode LED of the light source blocks 12, 14, 16 is in normal operation, the PNP transistor 52 and the NPN transistor 54 are then turned on, thus lighting each of the light-emitting diodes LED1 to LED6 of the light source block 12, the light-emitting diodes LED7 to LED12 of the light source block 14, and the light-emitting diodes LED13 to LED24 of the light source block 16.

Here, the light source block 16 still lights using normal light-emitting diodes even if there is a disconnection of one to five light-emitting diodes connected in parallel to one another among the light-emitting diodes LED13 to LED24 of the light source block 16.

For example, five light-emitting diodes LED13, LED15, LED17, LED19, LED21, which are arranged in a row and connected in parallel, may disconnect among the light-emitting diodes LED13 to LED24 of the light source block 16. In such case, current flows to the light-emitting diodes LED14, LED16, LED18, LED20, LED22, LED24 on the lower level via at least the normal light-emitting diode LED23 of the light source block 16.

Current flowing to the resistance R17 turns on the NPN transistor 54 and the PNP transistor 52, thus lighting the light-emitting diode LED23 on the upper level and the light-emitting diodes LED14 to LED24 on the lower level. In such case, the parallel number of disconnected light-emitting diodes (i.e., LED13, LED15, LED17, LED19, LED21) is a predetermined number of five or less (a number that satisfies the light distribution standard). Therefore, the light source block 16 in cooperation with the light source blocks 12, 14 functions as the stop lamp.

Meanwhile, there may be a disconnection of any six light-emitting diodes connected in parallel among the light-emitting diodes LED13 to LED24 of the light source block 16, e.g. the light-emitting diodes LED13, LED15, LED17, LED19, LED21, LED23 on the upper level may disconnect. Namely, the parallel number of disconnected light-emitting diodes (i.e., LED13, LED15, LED17, LED19, LED21, LED23) is six, which is more than the predetermined number of five (the number that satisfies the light distribution standard). In this case, the circuit is shut off and current no longer flows to the light source block 16.

As a consequence, the voltage at both ends of the resistance R17 drops (to 0 V) and the NPN transistor 54 and the PNP transistor 52 are turned off such that the supply of current to the light source blocks 12, 14, 16 is stopped. Accordingly, the light-emitting diodes LED1 to LED6 of the light source block 12, the light-emitting diodes LED7 to LED12 of the light source block 14, and the light-emitting diodes LED13 to LED24 of the light source block 16 are all turned off. Note that when the supply of current to the light source blocks 12, 14, 16 is stopped, the main abnormality detection circuit (not shown) between the switches 50, 58 and the on-board battery (DC power supply) communicates the occurrence of an abnormality resulting from the disconnection in the light source block 16 to the vehicle control unit (not shown).

According to the illustrated embodiment, with respect to the light blocks 12, 14 whose parallel numbers are three, the parallel number of disconnected light-emitting diodes being three, which is more than the predetermined number of two (the number that satisfies the light distribution standard), is used as a condition. Based on this condition, it is determined that an abnormality resulting from the disconnection has occurred in either the light source block 12 or 14, and the supply of current to the light source blocks 12, 14 stopped. It is thus not necessary to provide three line breakage detection circuits each for the light source blocks 12, 14 in order to determine abnormality of the light source blocks 12, 14, which can help reduce the number of components and lower costs.

Also, according to the illustrated embodiment, with respect to the light block 16 whose parallel number is six, the parallel number of disconnected light-emitting diodes LED being six, which is more than the predetermined number of five (the number that satisfies the light distribution standard), is used as a condition. Based on this condition, it is determined that an abnormality resulting from the disconnection has occurred in the light source block 16, and the supply of current to the light source blocks 12, 14, 16 stopped. It is thus not necessary to provide six line breakage detection circuits for the light source block 16 in order to determine abnormality of the light source block 16, which can help reduce the number of components and lower costs.

According to the illustrated embodiment, even if a portion of the light-emitting diodes of the light source blocks 12, 14, 16 disconnects, current is supplied to the light source blocks 12, 14 or the light source block 16 until the abnormality of the light source blocks 12, 14 or the light source block 16 is determined. Therefore, the light source blocks 12, 14 can be effectively utilized as a stop lamp, and the light source block 16 as a tail lamp.

Figure 2:
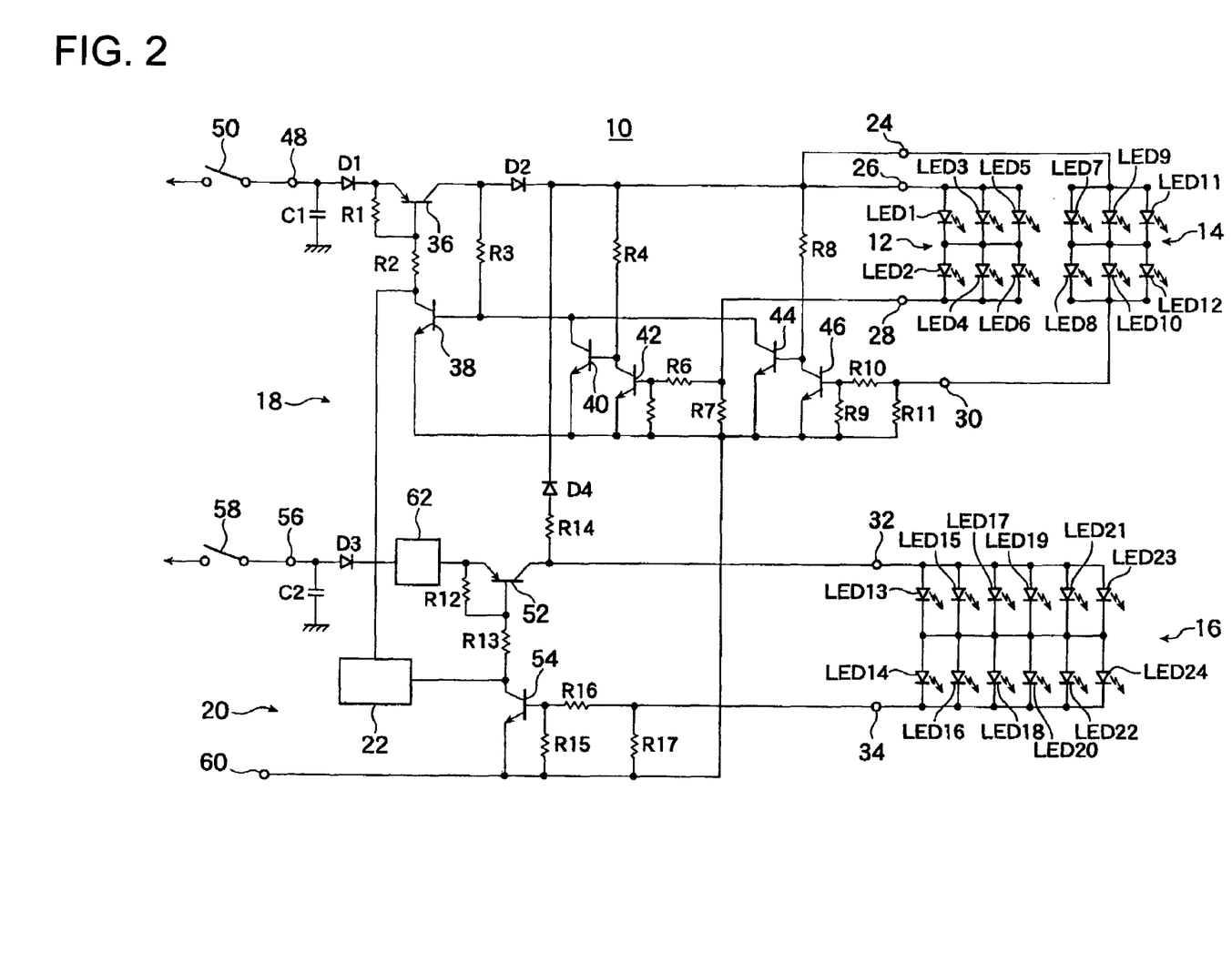
FIG. 2 is an example of a circuit diagram of a vehicular lamp that shows a second embodiment of the present invention.

Next, a second embodiment of the present invention will be described based on FIG. 2. This embodiment provides an oscillation circuit 62 between the emitter of the PNP transistor 52 and the cathode of the diode D3 of the abnormality determination circuit 20, and applies an output signal of the oscillation circuit 62 to the emitter of the PNP transistor 52. Other structures of the second embodiment are identical to the first embodiment.

The oscillation circuit 62 is configured, for example, as an oscillation circuit that generates a pulse width modulation (PWM) signal and applies the PWM signal at a constant on-duty ratio to the emitter of the PNP transistor 52.

Namely when the light-emitting diodes LED13 to LED24 of the light source block 16 are used as a tail lamp, the first embodiment employed a configuration that supplies tens of percent of the rated current to the light-emitting diodes LED13 to LED 24 through the PNP transistor 52. In this case, as shown in region A of FIG. 3, a current If of the light-emitting diodes LED13 to LED24 exhibits large variation due to the effect of fluctuations in the Vf-If characteristic.

Figure 3:
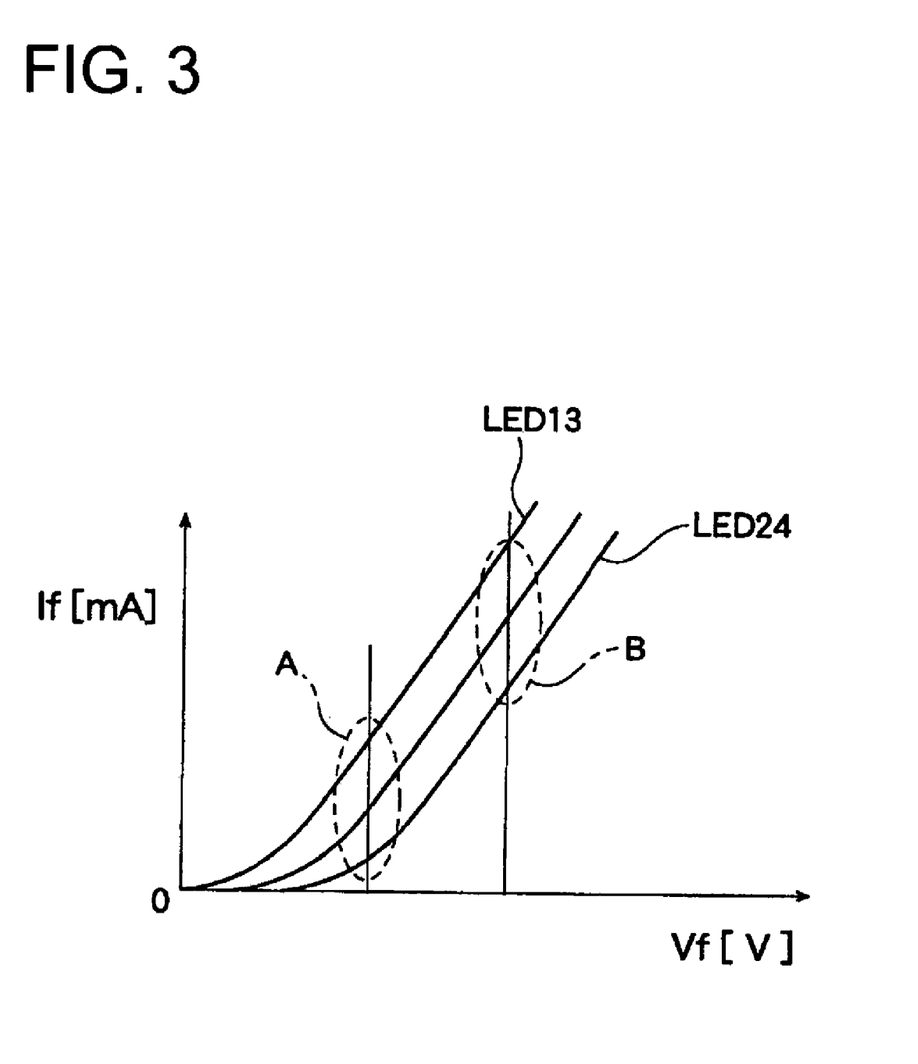
FIG. 3 is an example of a diagram of a Vf-If characteristic of a light-emitting diode.

However, when the PWM signal from the oscillation circuit 62 is applied at a constant duty ratio to the emitter of the PNP transistor 52, as shown in region B of FIG. 3, a forward voltage Vf that is applied to the light-emitting diodes LED13 to LED24 relatively increases, thus maintaining the current If of the light-emitting diodes LED13 to LED24 in a fixed range. Therefore, the light-emitting diodes LED13 to LED24 are not affected by fluctuations in the Vf-If characteristic, and can be lit at a near constant brightness.

Effects substantially identical to that of the first embodiment can be achieved with the second embodiment, and the light-emitting diodes LED13 to LED24 can be lit at a near constant brightness without being affected by fluctuations in the Vf-If characteristic.

Although the foregoing embodiments were described as examples in which the light source blocks 12, 14, 16 were formed using light-emitting diodes, the present invention is also applicable to an example that uses incandescent bulbs to form the light source blocks 12, 14, 16.

The parallel number of light-emitting diodes connected in parallel to one another may be another number provided that it is two or more.

The predetermined number pertaining to the parallel number of disconnected light-emitting diodes can be set based on the condition that the parallel number of disconnected light-emitting diodes reaching the predetermined number satisfies the light distribution standard. However, a circuit configuration is needed to ensure that, if the parallel number of the disconnected light-emitting diodes exceeds the predetermined number, current does not flow to other light-emitting diodes linked to the disconnected light-emitting diodes.

What is claimed is:

1. A vehicular lamp comprising:
    a light source that has a plurality of semiconductor light-emitting elements connected in parallel;
    an abnormality determination circuit arranged to control a supply of current from a power source to the light source, and arranged to determine the presence of an abnormality of the light source if the semiconductor light-emitting elements that are disconnected among the plurality of semiconductor light-emitting elements exceed a predetermined number, and arranged to stop the supply of current to the light source in response to the abnormality detection circuit determining that there is such an abnormality; and
    a supply voltage monitoring circuit that stops the abnormality determination performed by the abnormality determination circuit if a voltage of the power source falls to or below a set voltage.

2. The vehicular lamp according to claim 1 wherein the predetermined number is a number of the plurality of semiconductor light-emitting elements in parallel with one another.

3. The vehicular lamp according to claim 1 wherein the light source includes the plurality of semiconductor light-emitting elements connected in a matrix configuration.

4. A vehicular lamp comprising:
    a light source that has a plurality of semiconductor light-emitting elements connected in parallel; and
    an abnormality determination circuit arranged to control a supply of current from a power source to the light source, and arranged to determine the presence of an abnormality of the light source if the semiconductor light-emitting elements that are disconnected among the plurality of semiconductor light-emitting elements exceed a predetermined number, and arranged to stop the supply of current to the light source in response to the abnormality detection circuit determining that there is such an abnormality;
    wherein the abnormality determination circuit includes an oscillation circuit arranged to convert a current from the power source to the light source into a pulse width modulation signal.

5. The vehicular lamp according to claim 2 wherein the light source includes the plurality of semiconductor light-emitting elements connected in a matrix configuration.

6. A vehicular lamp comprising:
    a light source that has a plurality of semiconductor light-emitting elements connected in parallel;
    an abnormality determination circuit arranged to control a supply of current from a power source to the light source, and arranged to determine the presence of an abnormality of the light source if the semiconductor light-emitting elements that are disconnected among the plurality of semiconductor light-emitting elements exceed a predetermined number of the plurality of semiconductor light-emitting elements in parallel with one another, and arranged to stop the supply of current to the light source in response to the abnormality detection circuit determining that there is such an abnormality; and
    a supply voltage monitoring circuit that stops the abnormality determination performed by the abnormality determination circuit if a voltage of the power source falls to or below a set voltage.

7. A vehicular lamp comprising:
    a light source that has a plurality of semiconductor light-emitting elements connected in parallel in a matrix configuration;
    an abnormality determination circuit arranged to control a supply of current from a power source to the light source, and arranged to determine the presence of an abnormality of the light source if the semiconductor light-emitting elements that are disconnected among the plurality of semiconductor light-emitting elements exceed a predetermined number, and arranged to stop the supply of current to the light source in response to the abnormality detection circuit determining that there is such an abnormality; and
    a supply voltage monitoring circuit that stops the abnormality determination performed by the abnormality determination circuit if a voltage of the power source falls to or below a set voltage.

8. The vehicular lamp according to claim 5 comprising:
    a supply voltage monitoring circuit that stops the abnormality determination performed by the abnormality determination circuit if a voltage of the power source falls to or below a set voltage.

9. A vehicular lamp comprising:
    a light source that has a plurality of semiconductor light-emitting elements connected in parallel; and
    an abnormality determination circuit arranged to control a supply of current from a power source to the tight source, and arranged to determine the presence of an abnormality of the light source if the semiconductor light-emitting elements that are disconnected among the plurality of semiconductor light-emitting elements exceed a predetermined number of the plurality of semiconductor light-emitting elements in parallel with one another, and arranged to stop the supply of current to the light source in response to the abnormality detection circuit determining that there is such an abnormality;
    wherein the abnormality determination circuit includes an oscillation circuit arranged to convert a current from the power source to the light source into a pulse width modulation signal.

10. A vehicular lamp comprising:
    a light source that has a plurality of semiconductor light-emitting elements connected in parallel in a matrix configuration; and
    an abnormality determination circuit arranged to control a supply of current from a power source to the light source, and arranged to determine the presence of an abnormality of the light source if the semiconductor light-emitting elements that are disconnected among the plurality of semiconductor light-emitting elements exceed a predetermined number, and arranged to stop the supply of current to the light source in response to the abnormality detection circuit determining that there is such an abnormality;

wherein the abnormality determination circuit includes an oscillation circuit arranged to convert a current from the power source to the light source into a pulse width modulation signal.

11. The vehicular lamp according to claim 1 wherein the abnormality determination circuit includes an oscillation circuit arranged to convert a current from the power source to the light source into a pulse width modulation signal.

12. The vehicular lamp according to claim 8 wherein the abnormality determination circuit includes an oscillation circuit arranged to convert a current from the power source to the light source into a pulse width modulation signal.

* * * * *